(12) United States Patent
Nowak et al.

(10) Patent No.: US 9,020,128 B1
(45) Date of Patent: Apr. 28, 2015

(54) SYSTEM AND METHOD FOR COST-BASED AUTOMATIC CALL DISTRIBUTION WITH STATISTICALLY PREDICTABLE WAIT TIME

(71) Applicant: Avaya Inc., Basking Ridge, NJ (US)

(72) Inventors: Dawid Nowak, Dublin (IE); Joseph Smyth, Galway (IE)

(73) Assignee: Avaya, Inc., Basking Ridge, NJ (US)

( * ) Notice: Subject to any disclaimer, the term of this patent is extended or adjusted under 35 U.S.C. 154(b) by 0 days.

(21) Appl. No.: 14/050,648

(22) Filed: Oct. 10, 2013

(51) Int. Cl.
*H04M 3/00* (2006.01)
*H04M 5/00* (2006.01)
*H04M 3/523* (2006.01)
*G06Q 10/06* (2012.01)

(52) U.S. Cl.
CPC ......... *H04M 3/5238* (2013.01); *G06Q 10/0637* (2013.01)

(58) Field of Classification Search
CPC ........ G06Q 10/06; H04M 3/323; H04M 3/36; H04M 3/4285; H04M 3/493; H04M 3/51; H04M 3/5166; H04M 3/5175; H04M 3/5183; H04M 3/523; H04M 3/5232; H04M 3/5233; H04M 3/5237; H04M 3/5238; H04M 2203/2061; H04M 2242/12

USPC ............ 379/265.01, 265.02, 265.03, 265.04, 379/265.05, 265.06, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1
See application file for complete search history.

(56) References Cited

U.S. PATENT DOCUMENTS

| | | | | |
|---|---|---|---|---|
| 5,036,535 | A * | 7/1991 | Gechter et al. | 379/265.11 |
| 2003/0214950 | A1* | 11/2003 | Foster et al. | 370/395.32 |
| 2010/0274637 | A1* | 10/2010 | Li et al. | 705/11 |
| 2014/0093062 | A1* | 4/2014 | McCormack et al. | 379/265.12 |
| 2014/0173078 | A1* | 6/2014 | McCord et al. | 709/223 |

* cited by examiner

*Primary Examiner* — Khai N Nguyen
(74) *Attorney, Agent, or Firm* — Maldjian Law Group LLC; John Maldjian; Alexander D. Walter

(57) ABSTRACT

System and method to select a contact handling mode in a contact center, the method including: receiving, by a communication interface, a contact from a customer; calculating, by a processor of the contact center, an expected wait time by the customer based upon historical contact information stored in a memory of the contact center; calculating an expected cost of queueing the customer for the expected wait time; and selecting the contact handling mode based upon the expected cost of queueing the customer.

20 Claims, 6 Drawing Sheets

SYSTEM AND METHOD FOR COST-BASED AUTOMATIC CALL DISTRIBUTION WITH STATISTICALLY PREDICTABLE WAIT TIME

BACKGROUND

1. Field of the Invention

Embodiments of the present invention generally relate to contact center operation, and, in particular, to a system and method to use statistical measures of waiting time to determine the mode of handling that an arriving call should be accorded.

2. Description of Related Art

An incoming call or contact to a conventional contact center is queued while a routing engine of the contact center tries to find the first available agent or resource matching certain criteria in order to handle the call. The calls can be queued in the system for a very long while waiting for an available agent or resource. However, the call while queued occupies resources such as network bandwidth, CPU, etc., which could be used to handled other calls. This results in degraded service offered to customers and can lead to higher operating costs for call center operator. Thus, queued calls incur a cost to the call center operator, and conventionally this cost is ignored by decision making algorithms. The call may result in a financial loss to the contact center if it waits too long in queue.

Therefore, a need exists to provide an improved process to select a mode of handling a customer call, which takes into account the cost of queueing a call, in order to provide greater expected levels of profit for the contact center operator, and ultimately improved customer satisfaction.

SUMMARY

Embodiments of the present invention generally relate to a system and method to select a contact handling mode in a contact center, the method including: receiving, by a communication interface, a contact from a customer; calculating, by a processor of the contact center, an expected wait time by the customer based upon historical contact information stored in a memory of the contact center; calculating an expected cost of queueing the customer for the expected wait time; and selecting the contact handling mode based upon the expected cost of queueing the customer.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
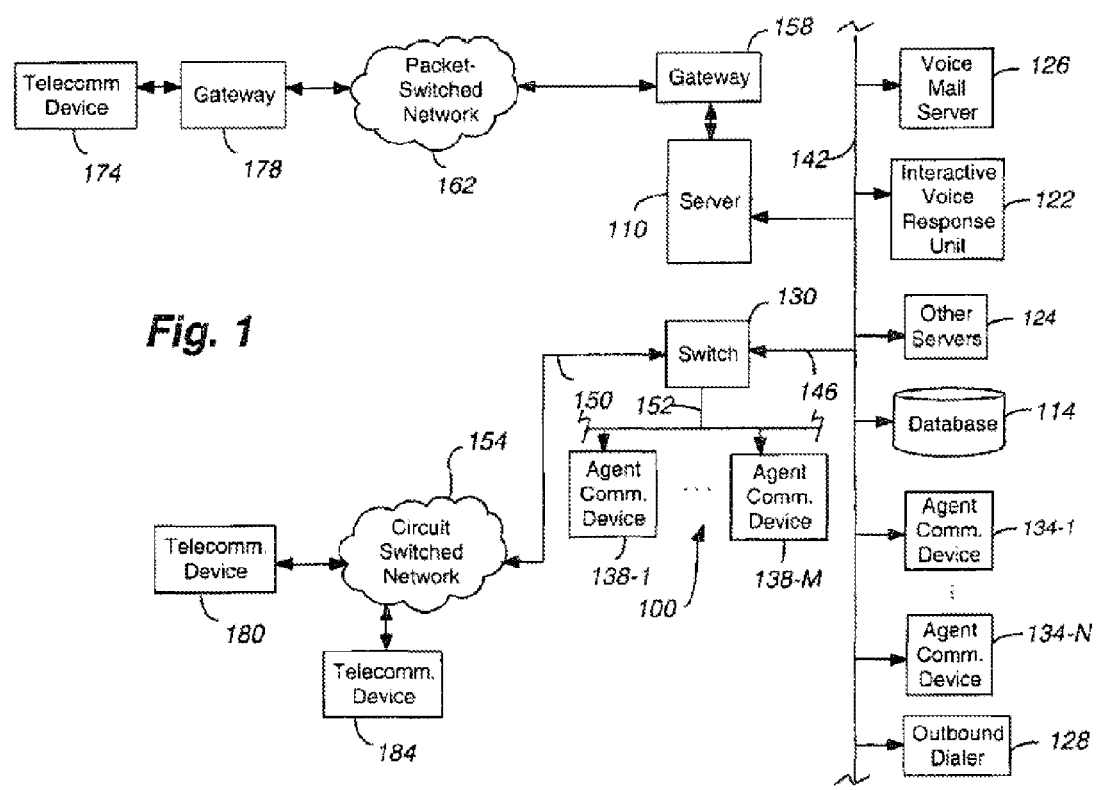
FIG. 1 is a block diagram depicting a contact center in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize contact centers to handle customer contacts.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein in connection with embodiments of the present invention, the term "contact" (as in "customer contact") refers to a communication from a customer or potential customer, in which a request is presented to a contact center. The request can be by way of any communication medium such as, but not limited to, a telephone call, e-mail, instant message, web chat, and the like.

As used herein in connection with embodiments of the present invention, the term "customer" denotes a party external to the contact center irrespective of whether or not that party is a "customer" in the sense of having a commercial relationship with the contact center or with a business represented by the contact center. "Customer" is thus shorthand, as used in contact center terminology, for the other party to a contact or a communications session.

The terms "switch," "server," "contact center server," or "contact center computer server" as used herein should be understood to include a Private Branch Exchange ("PBX"), an Automated Contact Distribution ("ACD") system, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "transmitter" may generally comprise any device, circuit, or apparatus capable of transmitting a signal. As used herein, the term "receiver" may generally comprise any device, circuit, or apparatus capable of receiving a signal. As used herein, the term "transceiver" may generally comprise any device, circuit, or apparatus capable of transmitting and receiving a signal. As used herein, the term "signal" may include one or more of an electrical signal, a radio signal, an optical signal, an acoustic signal, and so forth.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

Automatic Call Distribution ("ACD") is a communication server software feature that processes incoming, outgoing, and internal calls and distributes them to groups of extensions called hunt groups or splits. The communication server also sends information about the operation of the ACD to the Call Management System ("CMS") which stores and formats the data and produces real-time and historical reports on ACD activity. ACD is used by a contact center to route incoming calls to specifically assigned splits/skills and agents. ACD allows a system administrator to create an efficient call management environment.

FIG. 1 depicts an illustrative embodiment of a contact center of the present invention where contact center agents may service preferred contacts, either singularly or in multiples, simultaneously or substantially simultaneously, after a tolerable wait period or by way of an interruption from auxiliary work. A contact center 100 comprises a central server 110 (described in more detail in connection with FIG. 2), a set of data stores or databases 114, which may or may not be contained within the central server 110, the databases 114 containing agent metrics, historical agent and contact data, other contact related information, and other information in general that can enhance the value and efficiency of the contact, and a plurality of servers, namely a voice mail server 126, an Interactive Voice Response (IVR) unit/system 122, and other servers 124, an outbound dialer 128, a switch 130, a plurality of working agents operating packet-switched (first) telecommunication devices 134-1 to N (such as computer work stations or personal computers or handheld communication devices including wireless communication devices), and/or circuit-switched (second) telecommunication devices 138-1 to M, all interconnected by a local area network LAN (or wide area network WAN) 142.

The servers can be connected via optional communication lines 146 to the switch 130. As will be appreciated, the other servers 124 can also include a scanner (which is normally not connected to the switch 130 or Web server), VoIP software, video call software, voice messaging software, an IP voice server, a fax server, a web server, and an email server) and the like. The switch 130 is connected, via a plurality of trunks 150, to the Public Switch Telecommunication Network (PSTN) 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of telecommunications system switch or server, as well as other types of processor-based communication control devices such as media servers, computers, adjuncts, and the like.

The server and/or switch can be a software-controlled system, including, but not limited to, a processing unit (CPU), microprocessor, or other type of digital data processor executing software or an Application-Specific Integrated Circuit (ASIC) as well as various portions or combinations of such elements.

Figure 2:
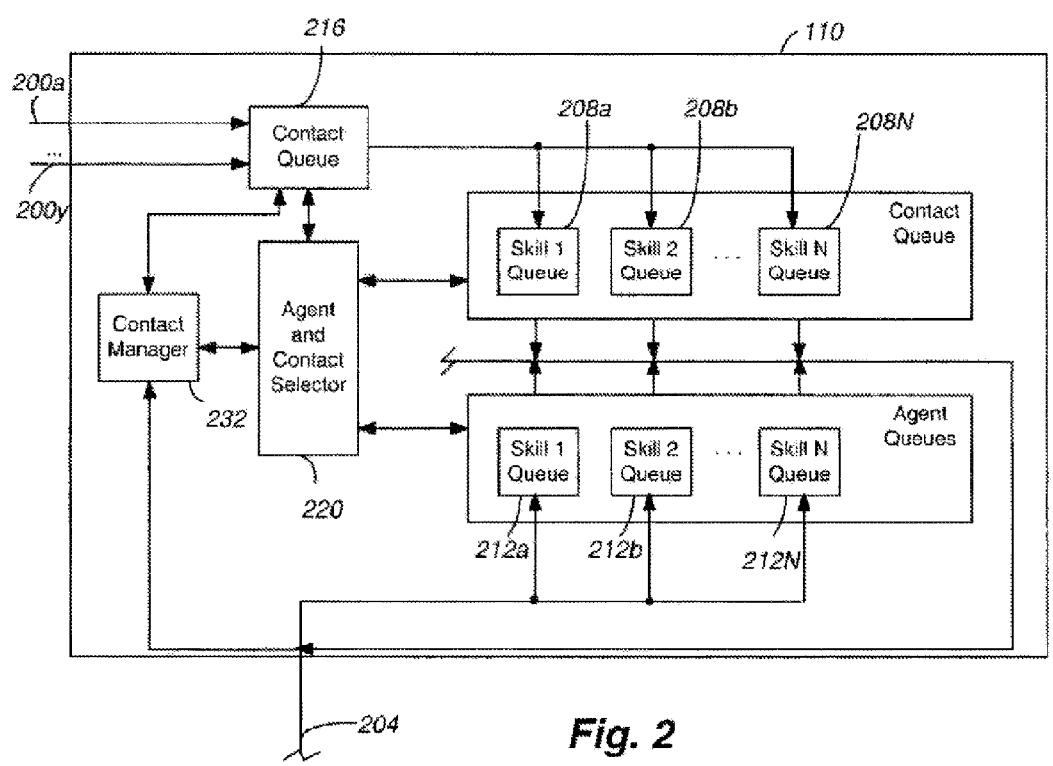
FIG. 2 is a block diagram depicting a server of the contact center of FIG. 1 in accordance with an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line). The server 110 can include a Basic Call Management System (BCMS) (not shown) and a Call Management System (CMS) (not shown) that gathers call records and contact-center statistics for use in generating contact-center reports.

The switch 130 and/or server 110 can be any computer and/or telecommunication architecture for directing contacts to one or more telecommunication devices to be serviced by one or more preferred agents. Illustratively, the switch and/or server 110 can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™; Communication Manager™, and/or 58300™ media server.

Typically, the switch/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (NIC) (not shown) to provide services to the serviced telecommunication devices. Other types of known switches and servers are well known in the art and therefore not described in detail herein.

Referring again to FIG. 2, included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and are either enqueued in individual ones of the contact queues 208a-n in their respective orders of priority or are enqueued in different ones of a plurality of contact queues that correspond to a different priority.

Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill. Each one of which corresponds to a different expertise level. Although depicted for clarity sake as skills of the agents, these queues equally may represent agent attributes or some other parameters such that the agents are matched up with contacts on a preferred agent basis.

In one embodiment of the present invention, as depicted in FIG. 2, a contact vector (queue) 216 is included among the control programs in the server 110. Contacts incoming to the contact center may be assigned by contact vector 216 to different contact queues 208a-n based upon a number of predetermined criteria, including customer identity, customer needs, contact center needs, current contact center queue lengths, customer value, and the agent skill, attributes or other parameters required for the proper handling of the contact and being designated as a preferred agent for a particular contact.

Agents who are determined to be preferred agents for a given contact, and are available for handling said contacts are assigned to agent queues 212a-n based upon the skills or attributes they possess. An agent may have multiple skills, attributes or other parameters, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Call vectoring is described in DEFINITY Communications System Generic 3. Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring again to FIG. 1, the gateway 158 can be Avaya Inc.'s, G700 Media Gateway™, and may be implemented as hardware, such as via an adjunct processor (as shown) or as a chip in the server.

The first telecommunication devices 134-1, . . . 134-N are packet-switched and can include, for example, IP hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises directly serviced by the switch. More particularly, these extensions correspond to conventional telecommunication device endpoints serviced by the switch/server, and the switch/server can direct incoming contacts or calls to, and receive outgoing contacts or calls, from these extensions in a conventional manner. The second telecommunication devices can include, for example, wired and wireless telephones, PDAs, H.320 video phones and conferencing units, voice messaging and response units, and traditional computer telephony adjuncts.

It should be noted embodiments of the present invention do not require any particular type of information transport medium between switch or server and first and second telecommunication devices. That is, the present invention may be implemented with any desired type of transport medium as well as combinations of different types of transport media.

The packet-switched network 162 can be any data and/or distributed processing network, such as the Internet. The network 162 typically includes proxies (not shown), registrars (not shown), and routers (not shown) for managing packet flows.

The packet-switched network 162 is in (wireless or wired) communication with an external first telecommunication device 174 via a gateway 178, and the circuit-switched network 154 with an external (wired) second telecommunication device 180 and (wireless) third telecommunication device 184. These telecommunication devices are referred to as "external" in that they are not directly supported as telecommunication device endpoints by the switch or server. The telecommunication devices 174 and 180 are an example of devices more generally referred to herein as "external endpoints."

In one configuration, the server 110, network 162, and first telecommunication devices 134 are Session Initiation Protocol (SIP) compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk. It should be understood the configuration of the switch, server, user telecommunication devices, and other elements as shown in FIG. 1 is for purposes of illustration only and should not be construed as limiting the present invention to any particular arrangement of elements.

As will be appreciated, the central server 110 is notified via LAN 142 of an incoming contact (e.g., a call) by the telecommunications component (e.g., switch 130, fax server, email server, web server, and/or other server) receiving the incoming contact. The incoming contact is held by the receiving telecommunications component until the server 110 forwards instructions to the component to forward or route the contact to a specific contact center resource, such as the IVR unit 122, the voice mail server 126, and/or first or second telecommunication devices 134, 138 associated with a selected preferred agent.

The server 110 distributes and connects these contacts to telecommunication devices of available preferred agents based on the predetermined criteria noted above. When the central server 110 forwards a voice contact to a preferred agent, the central server 110 also forwards customer-related information from databases 114 to the preferred agent's computer work station for viewing (such as by a pop-up display) to permit the preferred agent to better serve the contact. The preferred agent will then process the contact(s) sent to him/her by the server 110.

According to embodiments of the present invention, included among the programs executing on the server 110 are a preferred agent and contact selector 220 and contact manager 232. Contact selector 220 may also be referred to herein as a routing engine. The selector 220 and manager 232 are stored either in the main memory or in a peripheral memory (e.g., disk, CD ROM, etc.) or some other computer-readable medium of the center 100. The selector 220 and manager collectively effect an assignment between contacts in a queue and preferred agents serving the queue (either singularly or in multiple assignments) in a way that tends to maximize contact center efficiency.

Figure 3:
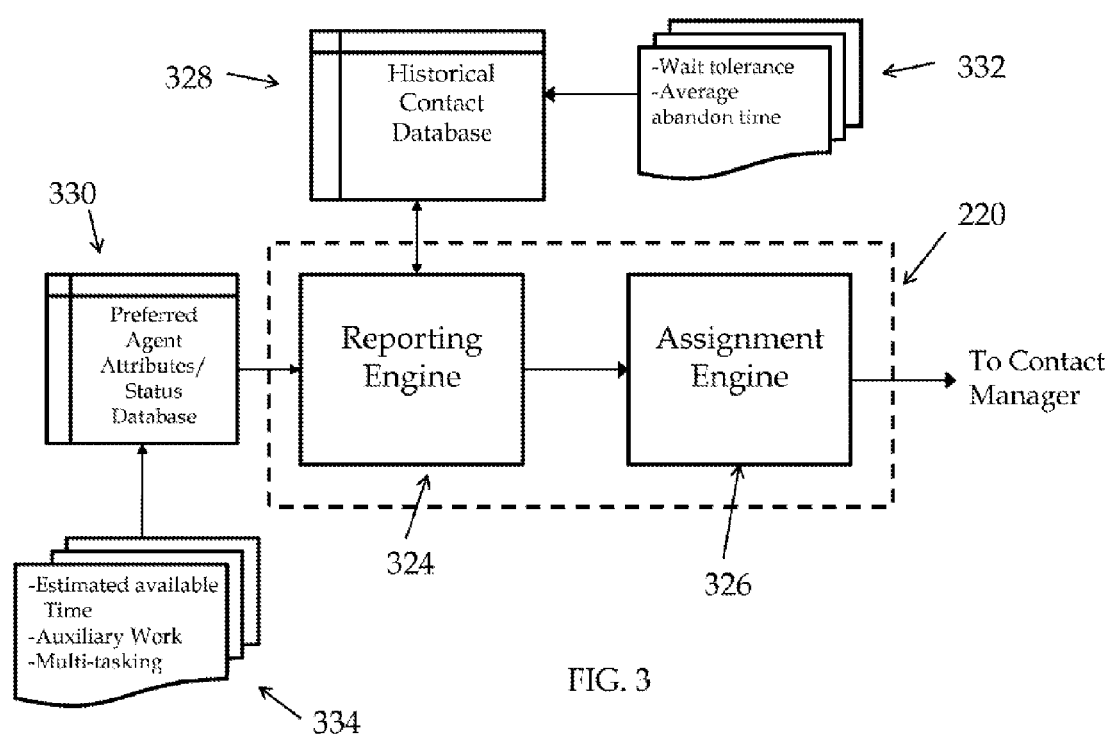
FIG. 3 is system block diagram of the server of FIG. 2, depicting a reporting engine and assignment engine in accordance with an embodiment of the present invention.

The selector 220 comprises a reporting engine 324 and assignment engine 326, see FIG. 3, which use predefined criteria in selecting a preferred agent to service the contact and whether one preferred agent is capable of being assigned to more than one contact at any given time.

In an embodiment of the present invention, the contact manager 232 receives assignment information from the selector 220, which selector has determined and identified, in addition to matching a preferred agent with a contact, dependant on skills, attributes or other parameters matched, the then current agent's availability, albeit not readily but within a tolerable wait period of the selected agent for singular or multiple contacts support, and provides instructions to the selector 220 to effect same.

The contact manager 232, based on one or more selected criteria, and agent match and availability or near availability, may determine which contacts will be assigned to the same preferred agent. One or more of the parameters can be used along or in any combination and include but are not limited to, average customer satisfaction score, average revenues, preferred language, preferred location, revenue potential, first call resolution rate, average quality score, and the like.

It is understood by embodiments of the present invention that a server, such as the one depicted in FIG. 2, may be connected to a computer network or system. A computer network includes the Internet, a global computer network, an internal computer network, dedicated server networks, and the like.

Referring to FIG. 3, which details the preferred agent and contact selector 220 of FIG. 2, there is provided within the selector 220 the reporting engine 324 and the assignment engine 326. The assignment engine may also be referred to herein as a work assignment engine. Contact historical database 328 communicates with the reporting engine 324. In addition, a preferred agent attribute and status database 330 also communicates with the reporting engine 324.

The type of historical data stored internally in the historical contact database 328 includes, among other information, wait tolerances and average abandon time of the contact 332 and estimated time for preferred agent availability, preferred agent auxiliary work schedule and preferred agent's multi-tasking capabilities 334.

When a customer calls a contact center 100, a gateway 158 initially handles the call and routes the call to a session manager, which may be hosted on a server such as server 110. The session manager may join or conference a media server such as server 124 to the customer call, and the customer call initially will be presented with some treatment. Treatment may include gathering information about the caller (e.g., caller ID, preferred language, etc.), gathering information about the reason for the call (e.g., billing, technical support, new service, etc.), or music-on-hold. The session manager will consult agent and contact selector 220 (i.e., the routing engine) to find the most applicable resource to handle the call.

Conventionally, the call will be queued while all resources needed by the call are busy, or until the customer drops the call. Much of the conventional art pertains to shortening the queue length or queue waiting time, or assigning resources to calls in a way that minimizes resource cost and usage after the call is answered and put on hold, or attempts to find the closest match between agent skills and customer needs.

In contrast, embodiments in accordance with the present invention provide a system and method to perform a cost-based call routing, which considers at the time that a contact first arrives at the contact center the anticipated cost of handling the contact, before deciding whether or not to handle the call by a contact center agent based upon whether the call is likely to produce a profit. If the call is not likely to produce a profit, a secondary form of treatment may be used to handle the call while incurring less or no cost for waiting in a queue. The secondary form of treatment may include less resource-intensive methods or less costly methods such as a touchtone response system, inviting the customer to leave a message, suggesting that the customer consult a FAQ or submit questions via a web interface, or to call back at a later time. Embodiments will thus tend to find an optimal resource at the lowest cost. Embodiment are able to adaptively change to changing conditions that would affect the ability of call center 100 to provide timely service, such as incoming call volume and resource availability including agent loading.

An advantage of at least some embodiments is that they will tend to maximize profit for the call center operator. Unlike the known art which queues an incoming call and then waits for available resources to become available, embodiments in accordance with the present invention will accept the incoming call only if, based upon past statistics of similar calls, the incoming call will bring a profit to the call center operator. Statistics may include expected waiting times of previous calls or callers sharing at least one characteristic with the incoming call or caller, and expected times to complete the contacts presently being serviced. In some embodiments, a determination of whether the incoming call would bring a profit may be based upon whether the length of the queue that the incoming call would be placed into is less than a predetermined threshold. Incoming calls that are not expected to provide a profit may be rejected, or the call may be handled by other forms of customer service, such as a touch-tone response system or a callback system.

Embodiments in accordance with the present invention use a decision making process that is based on real-time analysis of cost and revenue, while striving to maximize the profit for the call center operator. Embodiments in accordance with the present invention provide a cost-based routing process and system to match incoming customer calls with a sufficiently suitable resource. Embodiments assume that all calls waiting for processing have an associated cost while waiting, and that a profit margin is improved when a customer request has been more quickly connected to a sufficiently suitable resource.

Embodiments assume that the cost to a contact center operator of a queued call is proportional to the time the call is spent waiting for an available resource (including a suitable agent). Embodiments will tend to optimize the call routing in such a way that the difference between the total revenue and the total cost is maximized, thereby tending to maximize the profit of the call center operator.

Embodiments may improve the reliability of predictions for how long the customer will wait for a resource, and for expected times for resources to become available, by querying a database of historical statistics for previous calls. Upon completion of the present call, the historical database may be updated with statistics derived from the just-completed call.

Embodiments in accordance with the present invention attempt to maximize profit, as expressed by Eq. (1):

$$\text{Profit} = \sum_n P(t) - \sum_n C(t, n) \qquad (1)$$

In Eq. (1), total Profit is the difference between total payment P(t) and total cost C(t,n), over the number n of calls being handled and the length of time t that the call is on hold. Payment P(t) is the revenue earned by the call center for handling the n-th customer contact. Examples of payment P(t) may include a horizontal function (i.e., a flat fee per call), a declining function (i.e., incentives are provided to answer a call quickly or penalties assessed if a call is answered too slowly), or some combination (e.g., a declining stair-step).

Examples of cost C(t) may include a fixed cost, a variable cost, or a combination of both fixed and variable costs. Fixed cost may include an allocated portion of overhead costs. The variable cost may include a function that increases monotonically (e.g., linearly rising) with the length of time spent waiting in a queue. Cost may also be a function of the number n of calls being handled, e.g., if the number of calls is great enough, then additional resources (e.g., more trunks, more agents, etc.) need to be added. In some embodiments, the cost may be modeled as depending only upon the length of time t that the call is on hold. After an agent has answer the call, the call is no longer queued in the system and a different pricing model should apply. It may be assumed without loss of generality that the cost of a call after the agent begins handling the call is already incorporated into payments P(t) and cost C(t).

Figure 4:
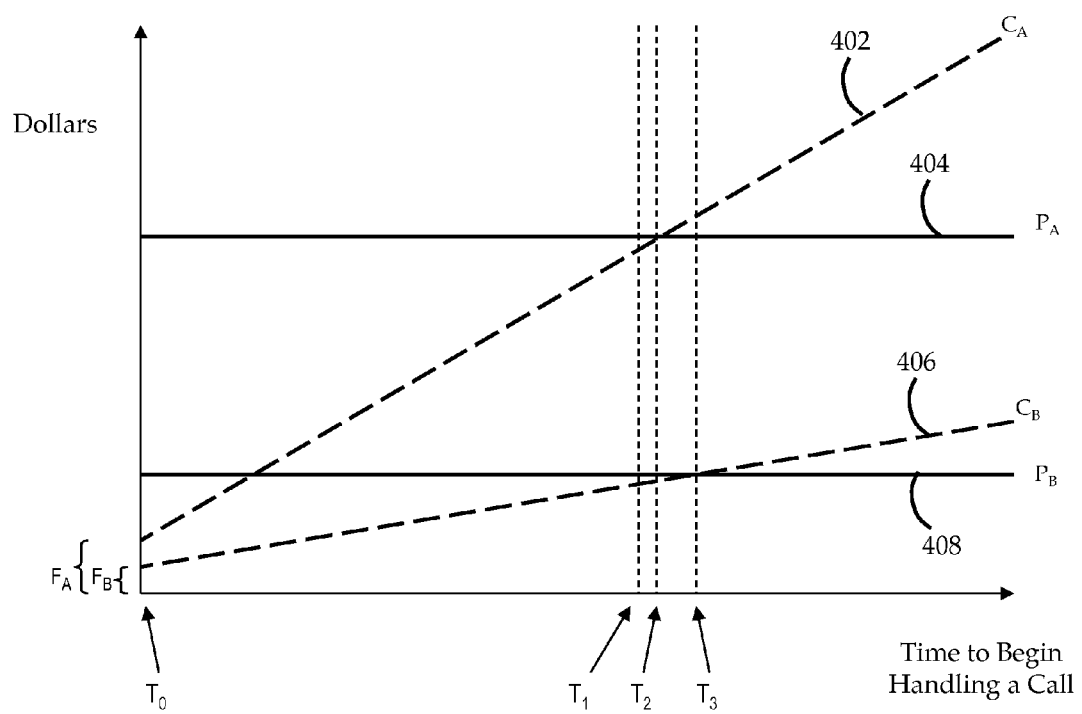
FIG. 4 is a cost and revenue model of a contact center in accordance with an embodiment of the present invention.

FIG. 4 illustrates a simplified cost and payment (i.e., revenue) model 400 in accordance with an embodiment of the present invention. Model 400 is presented as a graph of dollars or other currency (ordinate axis) and time until the call is begun handled (abscissa axis), and illustrates how cost and payment changes as a function of how much time a call waits in queue to be handled. The profit at any point in time, if the call were answered at that time, may consequently be calculated as the difference between the payment curve and the associated cost curve at that point in time.

Model 400 illustrates two different modes of customer service that may be available (i.e., "A" and "B"), including associated costs and payment. For example, customer service mode "A" is represented by a cost curve 402 labeled "$C_A$" and a payment curve 404 labeled "$P_A$." Customer service mode "B" is represented by a cost curve 406 labeled "Cs" and a payment curve 408 labeled "$P_B$." Cost curves 402, 406 may include a respective fixed cost component FA, FB, which may represent fixed costs such as an allocation of overhead costs. Model 400 may be further extended with additional customer service modes "C", "D", etc. (not illustrated). Model "A" may, for example, represent handling the call by a live agent in the U.S., and model "B" may represent a lower cost method such as handling the call by a live agent overseas or handling the call by a touch-tone response system.

Initially, at time $T_0$, service mode "A" produces higher profit than service mode "B", as illustrated below in Eq. (2).

$$(P_A(T_0) - C_A(T_0)) > (P_B(T_0) - C_B(T_0)) \qquad (2)$$

However, over time the cost of service mode "A" increases as the time spent in queue increases. At time $T_1$ the profit produced by service modes "A" and "B" are equal, and at time $T_2$ the call would no longer be profitable using service mode "A", as illustrated below in Eq. (3).

$$(P_A(T_2) - C_A(T_2)) = 0 \qquad (3)$$

After time $T_2$, if the call is waiting for service mode "A" and the queue waiting time for service mode "A" lasts that long, the call is now producing a loss. Similarly, after time $T_3$, if the call is waiting for service mode "B" and the queue waiting time for service mode "B" lasts that long, the call is now producing a loss.

Contact center 100 may decide not to handle a call by mode "A", or may decide to handle the call by some secondary method such as service mode "B." The caller may hear a message such as "Press 1 to use our automated response system, or press 2 to leave a message." Service mode "B" may produce less profit than service mode "A" if the queue waiting time is short, but may be profitable for longer queue waiting times because costs increase more slowly. Service mode "B" would be profitable for the calling center until the queue waiting time exceeds $T_3$.

Figure 5A:
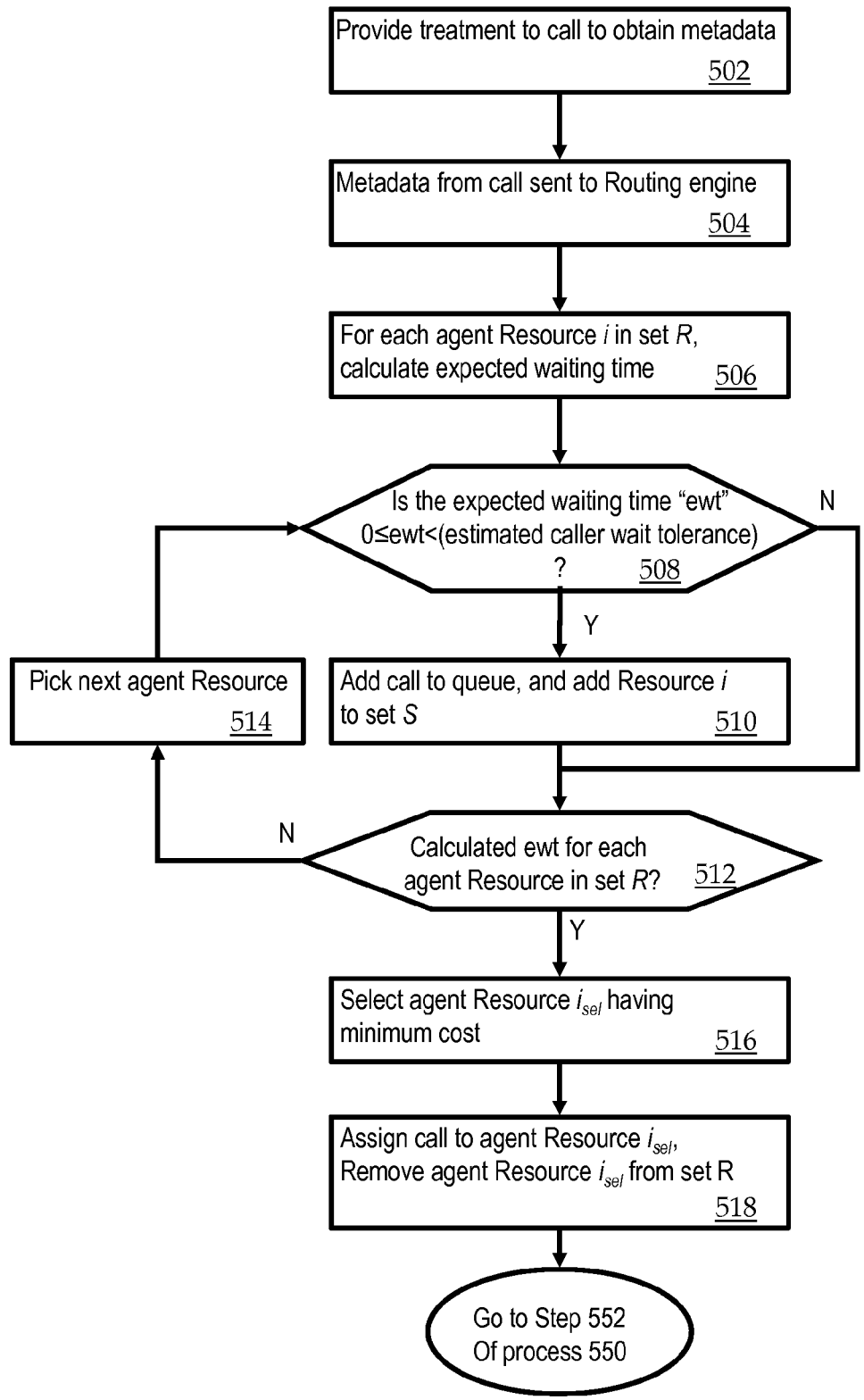
FIGS. 5A-5B illustrates at a high level of abstraction a process in accordance with an embodiment of the present invention.

FIG. 5A illustrates a flow chart of process 500 in accordance with an embodiment of the present invention. Process 500 may be hosted on, and/or performed by, a server of contact center 100, such as server 124. In process 500, set "R" represents a set of all resources that may be needed in order to service a call. Resources needed to service a call may include an agent (e.g., the agent's time or availability), contact center capacity or port availability, etc. An individual resource "i" within R may be referred to herein as "$R_i$". The amount of time that resource $R_i$ currently has been handling a call may be referred to herein as $t_{call,i}$. The estimated average call duration handled by a specific resource "i" may be referred to herein as $\overline{t_{call,i}}$. The estimated average call duration handled by all resources may be referred to herein as $\overline{t_{call}}$. A more specific estimate $\overline{t_{call,i}}$ may be preferable to a more general estimate $\overline{t_{call}}$ when some agents have non-fungible skills needed by the call.

The expected wait time for a customer to be connected to the agent may be referred to herein as $t_{ewt}$. The estimated upper time limit (i.e., an estimated tolerance) that a customer will wait on hold for an agent before hanging up may be referred to herein as $\overline{t_{ewt}}$.

A call "j" arriving at a call center 100 or routing engine 220 within call center 100 may be referred to herein as $CL_j$.

Process 500 begins at step 502, at which the contact center 100 may provide treatment to an incoming call $CL_j$. Although process 500 may be described in terms of a call, persons of skill in the art will be able to adapt process 500 to other modes of customer contact through appropriate communication interfaces, such as Skype™ video contact, email, instant message, web chat, and so forth. Treatment may include gathering information about the caller (e.g., caller ID, organizational membership, preferred language, etc.), gathering information about the reason for the call (e.g., billing, technical support, new service, etc.), gathering a history of previous customer support for this customer, determining a service level that the customer is entitled to, music-on-hold, and so forth. At least some of the information so gathered may be considered to be metadata, i.e., data about other data such as the call itself. Control of process 500 then transfers to step 504.

Next, at step 504, metadata from the treatment is provided to routing engine 220, i.e., a module within the contact center that is responsible for assigning contact center resources to the incoming contact. The metadata may be used to help select an appropriate resource, e.g., an agent that speaks Spanish. Control of process 500 then transfers to step 506.

Next, in accordance with an embodiment of the present invention, when a call $CL_j$ arrives at routing engine 220, the routing engine will determine a status of resources within set R. The contact center 100 will calculate, by use of a processor coupled to a memory, an expected waiting time for each resource (e.g., agent resource i) that may be used by call $CL_j$. In some embodiments, the expected waiting time may be calculated only for agent resources that match a predetermined metadata criterion of the incoming call or caller. The memory includes storage of data and instructions, the instructions when carried out by the processor are designed to perform the desired calculation. Step 506 of process 500 is where the first such resource is checked. After step 506 concludes, control of process 500 transfers to decision step 508.

At step 508, a decision is made regarding $R_1$, wherein $1 \leq i \leq N$, with N being the population size of the set of resources that could be devoted to the incoming contact. The decision is whether or not the expected waiting time for $R_i$ (i.e., $\overline{t_{call,i}}$) is greater than zero (e.g., that the i-th agent has not already exceeded the average call duration) and that the expected waiting time for $R_i$ is less than the estimated customer waiting time tolerance ($t_{cwt}$). Alternatively, in place of $\overline{t_{call,i}}$, step 508 may use the expected waiting time over the set of all resources ($t_{call}$), or over a subset of resources that are better matched to customer need than the general population of resources. If the result of decision step 508 is positive, control of process 500 transfers to step 510. If the result of decision step 508 is negative, control of process 500 transfers to decision step 512.

In some embodiments of step 508, if the i-th agent has already exceeded the average call duration, the expected call duration for the i-th agent for this call is recalculated from this point, so that resource $R_i$ may still be considered for use.

At step 510, the incoming call $CL_j$ is added to a queue of calls to be answered, and $R_i$ is deemed to be a qualified resources that could be used to service the incoming call $CL_j$, based upon estimated times. For each qualified resource $R_i$, a cost $C_{R(i)}$ may be calculated. In particular, in some embodiments, the cost of using $R_i$ may calculated (by a processor of contact center 100) as each $R_i$ is deemed to be qualified, and a running tally of the lowest-cost $R_i$ may be maintained. As a new $R_i$ is deemed qualified, if its cost is less than the current least-cost resource, then the newly qualified $R_i$ would be designated as the current least-cost resource. In other embodiments, the cost of using each $R_i$ may be determined later, for example when an entire set S of qualified resources has been identified. The lowest cost resource may be determined from among the membership of set S.

In some embodiments, determining that $R_i$ may a qualified resource may also include a calculation—at that time—of whether usage of $R_i$ would produce a profit for the contact center operator. Only if a profit would be produced would $R_i$ be deemed to be a qualified resource.

It is assumed that the resource $R_i$ is adequate to service the call, however methods described herein may be extended to usage of multiple resources to service the call. A minimum cost will be found from all calculated costs $C_{R(i)}$, and the minimum cost will be compared to the expected payment P. If the minimum cost is smaller than the payment P, then call $CL_j$ will be added to a queue. It is assumed that there will be at most one call waiting in a queue per resource $R_i$.

At the conclusion of step 510, control of process 500 transfers to decision step 512.

At decision step 512, a decision is made whether all resources have been checked as to whether the expected wait time for the resource is within a desired range of times. If the result of decision step 512 is positive, control of process 500 transfers to step 514. If the result of decision step 512 is negative, control of process 500 transfers to step 516.

At step 514, the next agent resource in set R is selected, and control of process 500 transfers to step 508.

At step 516, an agent resource having the smallest cost is selected to service the incoming call $CL_j$. The selected agent resource is denoted as $i_{sel}$. The selected agent resource (i.e., $R_{isel}$) will be excluded from further matches. If the minimum cost is greater than the payment P, then call $CL_j$ may be handled by an alternative method, such as a touch-tone menu option, or the caller of call $CL_j$ may be asked to leave a message or to call back later. In some embodiments, the minimum cost may exceed a configurable threshold difference from the payment P before call $CL_j$ is handled by an alternative method. Control of process 500 then transfers to step 518.

Next, at step 518, the incoming call $CL_j$ is assigned to the agent resource $i_{sel}$ selected from step 516. Control of process 500 then transfers to step 552 of process 550, as illustrated in FIG. 5B.

Figure 5B:
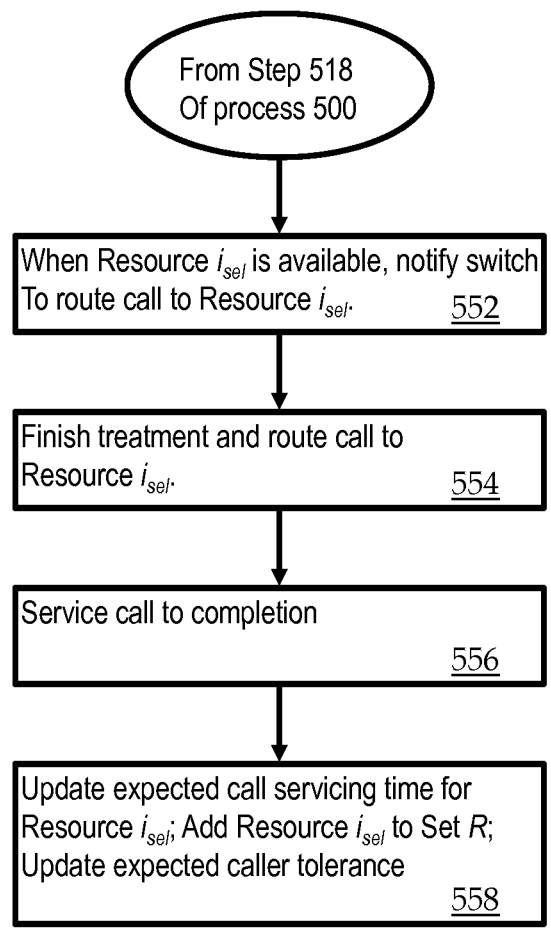

Referring now to FIG. 5B, at step 552, when existing call $CL_{j-1}(R_i)$ is completed and the selected agent resource $i_{sel}$ is available, the routing module will notify the switch to route the incoming call $CL_j$ to the selected agent resource $i_{sel}$. However, the queue waiting time for the incoming call $CL_j$ may be variable since the amount of time it takes an agent resource to conclude their current call is not precisely known in advance. In some embodiments, before the selected agent resource $i_{sel}$ has begun to handle the call $CL_j$, the queue waiting time may be monitored to determine if it has in fact equaled or exceeded a configurable threshold, such as a break-even point for the contact center, or some predetermined percentage of the break-even point for the call center operator (e.g., 95%, 105%, etc.), or some predetermined percentage of $t_{cwt}$, etc. If the configurable threshold has been met or exceeded, the incoming call $CL_j$ may be handled by an alternative method such as a touch-tone response system. At the completion of step 552, control of process 550 then transfers to step 554.

Next, at step 554, the treatment of the incoming call $CL_j$ is stopped, and the switch is activated in order to route the incoming call $CL_j$ the to the selected agent resource $i_{sel}$. Control of process 550 then transfers to step 556.

Next, at step 556, the incoming call $CL_j$ is serviced by the selected agent resource $i_{sel}$. Ordinarily the call $CL_j$ will be serviced to completion by the selected agent resource $i_{sel}$, but transferred to other agents resources in some circumstances. Control of process 550 then transfers to step 558.

Next, at step 558, servicing of the incoming call $CL_j$ has completed. The contact center may then update its historical statistics so that handling of future calls can be improved. For example, the expected call servicing time may be updated for resource $i_{sel}$ (i.e., $\overline{t_{call,i}}$) and/or for the set of all resources (i.e., $\overline{t_{call}}$). The agent resource $i_{sel}$ may be added back to the set R of available agent resources for future calls.

The expected caller tolerance may also be updated, based upon the actual time that the incoming call $CL_j$ spent waiting in queue, either as an acceptable waiting time if the incoming caller waited in queue until agent resource $i_{sel}$ was able to service the incoming call $CL_j$, or an unacceptable waiting time if the incoming caller dropped from the queue before agent resource $i_{sel}$ was able to service the incoming call $CL_j$.

The updated historical statistics will be calculated by use of a processor, and will be stored in a non-volatile database that is accessible to the processor, in accordance with embodiments described herein.

Embodiments of the present invention include a system having one or more processing units coupled to one or more memories. The one or more memories may be configured to store software that, when executed by the one or more processing unit, allows practice of embodiments described herein, at least by use of processes described herein, including at least in FIGS. 3A-3B, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method to select a contact handling mode in a contact center, comprising the steps of:
    receiving, by a communication interface, a contact from a customer;
    processing the received contact to derive metadata associated with the received contact;
    retrieving historical contact information from a historical contact database;
    determining, by a processor of the contact center, a set of qualified resources to handle the contact based on the derived metadata, wherein each resource is associated with a contact handling mode;
    predicting, by the processor of the contact center, an expected wait time by the customer based on the retrieved historical contact information;
    calculating, by the processor of the contact center, an expected cost of queuing the customer for the predicted wait time;
    calculating for each qualified resource, by the processor of the contact center, a profit associated with using the qualified resource; and
    selecting, by the processor of the contact center, a contact handling mode based on the calculated profit and the expected cost of queuing.

2. The method of claim 1, wherein the metadata includes at least information about the customer and reason for the contact.

3. The method of claim 1, wherein the historical contact information includes at least a history of previous customer support for the customer, a service level that the customer is entitled to, wait tolerance, average abandon time of the contact, estimated time for preferred agent availability, preferred agent auxiliary work schedule and preferred agent's multitasking capabilities.

4. The method of claim 1, further comprising the step of queuing the contact for the selected contact handling mode.

5. The method of claim 1, wherein the step of selecting the contact handling mode comprises a step of comparing an expected cost of using the contact handling mode to an expected payment received from using the contact handling mode.

6. The method of claim 1, wherein the profit comprises a difference between revenue derived from the selected contact handling mode, less a cost of queuing the contact for the selected contact handling mode.

7. The method of claim 1, wherein the contact handling mode is selected from a set of available contact modes, wherein the set of available contact modes includes not handling the contact.

8. The method of claim 1, wherein the step of determining a set of qualified resources comprises matching a resource to a metadata related to the contact.

9. The method of claim 1, wherein the step of calculating a profit comprises usage of historical statistical data.

10. The method of claim 9, wherein the historical statistical data is updated at the conclusion of the contact.

11. The method of claim 1, further comprising the steps of:
    recalculating profit based upon a present status of queued contacts; and
    changing the selected contact handling mode if the profit changes by more than a configurable threshold.

12. A system to select a contact handling mode in a contact center, comprising:
    a communication interface configured to receive a contact from a customer;
    a historical contact database configured to store historical contact information;
    a computer-accessible memory;
    a processor coupled to the computer-accessible memory, the processor configured to perform the steps of:
    processing the received contact to derive metadata associated with the received contact;

retrieving the historical contact information from the historical contact database;

determining a set of qualified resources to handle the contact based on the derived metadata, wherein each resource is associated with a contact handling mode;

predicting an expected wait time by the customer based on the retrieved historical contact information;

calculating an expected cost of queuing the customer for the predicted wait time;

calculating for each qualified resource a profit associated with using the qualified resource; and selecting a contact handling mode based on the calculated profit and the expected cost of queuing.

13. The system of claim 12, wherein the metadata includes at least information about the customer and reason for the contact.

14. The system of claim 12, wherein the historical contact information includes at least a history of previous customer support for the customer, a service level that the customer is entitled to, wait tolerance, average abandon time of the contact, estimated time for preferred agent availability, preferred agent auxiliary work schedule and preferred agent's multitasking capabilities.

15. The system of claim 12, wherein the processor is further configured to perform a step of queuing the contact for the selected contact handling mode.

16. The system of claim 12, wherein the processor is further configured to perform a step of comparing an expected cost of using the contact handling mode to an expected payment received from using the contact handling mode.

17. The system of claim 12, wherein the profit comprises a difference between revenue derived from the selected contact handling mode, less a cost of queuing the contact for the selected contact handling mode.

18. The system of claim 12, wherein the processor is further configured to perform a step of matching a resource to a metadata related to the contact.

19. The system of claim 12, wherein the step of calculating a profit comprises usage of historical statistical data.

20. The system of claim 12, wherein the processor is further configured to perform the steps of:

recalculating profit based upon a present status of queued contacts; and changing the selected contact handling mode if the expected profit changes by more than a configurable threshold.

* * * * *